United States Patent
Chik et al.

(10) Patent No.: US 10,002,641 B1
(45) Date of Patent: Jun. 19, 2018

(54) SYSTEMS AND METHODS FOR DETERMINING HIGHLIGHT SEGMENT SETS

(71) Applicant: GOPRO, INC., San Mateo, CA (US)

(72) Inventors: Desmond Chik, Mountain View, CA (US); Daniel Tse, San Mateo, CA (US); Jonathan Wills, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 116 days.

(21) Appl. No.: 15/295,862

(22) Filed: Oct. 17, 2016

(51) Int. Cl.
- *G11B 27/00* (2006.01)
- *H04N 5/93* (2006.01)
- *H04N 9/80* (2006.01)
- *G11B 27/034* (2006.01)
- *G11B 27/11* (2006.01)
- *G06K 9/00* (2006.01)
- *G06K 9/62* (2006.01)

(52) U.S. Cl.
CPC .......... *G11B 27/034* (2013.01); *G06K 9/0055* (2013.01); *G06K 9/00758* (2013.01); *G06K 9/00765* (2013.01); *G11B 27/11* (2013.01); *G06K 9/6269* (2013.01)

(58) Field of Classification Search
None
See application file for complete search history.

(56) References Cited

U.S. PATENT DOCUMENTS

| 6,633,685 | B1 | 10/2003 | Kusama |
| 7,222,356 | B1 | 5/2007 | Yonezawa |
| 7,483,618 | B1 | 1/2009 | Edwards |
| 7,512,886 | B1 | 3/2009 | Herberger |
| 7,885,426 | B2 | 2/2011 | Golovchinsky |

(Continued)

FOREIGN PATENT DOCUMENTS

| JP | H09181966 A | 7/1997 |
| JP | 2005252459 A | 9/2005 |

(Continued)

OTHER PUBLICATIONS

PCT International Search Report and Written Opinion for PCT/US2015/023680, dated Oct. 6, 2015, 13 pages.

(Continued)

*Primary Examiner* — Heather Jones
(74) *Attorney, Agent, or Firm* — Sheppard Mullin Richter & Hampton LLP (57) ABSTRACT

A system and/or method configured to determine highlight segment sets. Content files that define content in content segment sets may be obtained. Individual highlight segment sets of content segments may be determined from the content segment sets. Determining a first highlight segment set of content segments included in the first content segment may include iterating (a)-(c) for multiple iterations. At (a), individual content segments included in the first content segment set may be selected as a selected content segment for inclusion in the first highlight segment set. At, (b) diversity scores for content segments that are (i) included in the first content segment set and (ii) not yet selected for inclusion in the first highlight segment set may be determined. At (c), one or more of the content segments may be disqualified for inclusion in the first highlight segment set for future iterations based on the diversity scores.

24 Claims, 4 Drawing Sheets

(56) References Cited

U.S. PATENT DOCUMENTS

| | | |
|---|---|---|
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,253,533 B1 | 2/2016 | Morgan |
| 9,342,376 B2 | 5/2016 | Jain |
| 9,396,385 B2 | 7/2016 | Bentley |
| 9,418,283 B1 | 8/2016 | Natarajan |
| 2002/0165721 A1 | 11/2002 | Chang |
| 2004/0001706 A1 | 1/2004 | Jung |
| 2004/0128317 A1 | 7/2004 | Sull |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2007/0204310 A1 | 8/2007 | Hua |
| 2007/0230461 A1 | 10/2007 | Singh |
| 2007/0286579 A1* | 12/2007 | Murabayashi ......... G11B 27/28 386/241 |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0253735 A1 | 10/2008 | Kuspa |
| 2008/0313541 A1 | 12/2008 | Shafton |
| 2009/0019995 A1 | 1/2009 | Miyajima |
| 2009/0125559 A1 | 5/2009 | Yoshino |
| 2009/0213270 A1 | 8/2009 | Ismert |
| 2009/0252474 A1 | 10/2009 | Nashida |
| 2010/0046842 A1 | 2/2010 | Conwell |
| 2010/0086216 A1 | 4/2010 | Lee |
| 2010/0104261 A1 | 4/2010 | Liu |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0293250 A1* | 12/2011 | Deever ............. G06F 17/30811 386/290 |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0210205 A1 | 8/2012 | Sherwood |
| 2012/0246114 A1 | 9/2012 | Edmiston |
| 2012/0283574 A1 | 11/2012 | Park |
| 2012/0311448 A1 | 12/2012 | Achour |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0330019 A1 | 12/2013 | Kim |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |
| 2015/0156247 A1 | 6/2015 | Hensel |
| 2015/0186073 A1 | 7/2015 | Pacurariu |
| 2015/0287435 A1 | 10/2015 | Land |
| 2015/0318020 A1 | 11/2015 | Pribula |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0094601 A1 | 3/2016 | Besehanic |
| 2016/0103830 A1 | 4/2016 | Cheong |
| 2016/0189752 A1 | 6/2016 | Galant |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0358603 A1 | 12/2016 | Azam |
| 2016/0366330 A1 | 12/2016 | Boliek |
| 2017/0078767 A1* | 3/2017 | Borel ................. H04N 21/8549 |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |

(56) References Cited

FOREIGN PATENT DOCUMENTS

| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Ernoult, Emeric, "How to Triple Your YouTube Video Views with Facebook", SocialMediaExaminer.com, Nov. 26, 2012, 16 pages.

PCT International Preliminary Report on Patentability for PCT/US2015/023680, dated Oct. 4, 2016, 10 pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 Pages.

PCT International Search Report and Written Opinion for PCT/US15/12086 dated Mar. 17, 2016, 20 pages.

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lafv_decoding.html>.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Japanese Office Action for JP Application No. 2013-140131, dated Aug. 5, 2014, 6 pages.

Office Action for U.S. Appl. No. 13/831,124, dated Mar. 19, 2015, 14 pages.

PSonar URL: http://www.psonar.com/about retrieved on Aug. 24, 2016, 3 pages.

* cited by examiner

SYSTEMS AND METHODS FOR DETERMINING HIGHLIGHT SEGMENT SETS

This disclosure relates to systems and methods for determining highlight segments sets.

BACKGROUND

Digital cameras are increasingly used to capture images and/or audio content of events and their surroundings. The images may include one or more video clips, and/or still images. The video clips, for example, may include a series of single image frames and/or corresponding audio content. Users may capture large quantities of video clips, audio content, and/or still images per event. Some of the video clips, audio content, and/or still images may be similar to one another.

Sets of captured video clips, audio segments, and/or images may be editable, for example, in post capture editing processes. The post capture editing process may include selecting highlights from the sets of captured video clips, audio segments, and/or images. However, requiring the user to review and evaluate each captured video clip, audio segment, and/or image to select portions that are highlight worthy and/or remove portions that are irrelevant, uninteresting, and/or too similar to other highlights may be cumbersome, resource intensive, and time consuming.

SUMMARY

One aspect of the present disclosure relates to determining highlight segment sets. In some implementations, the highlight segment sets may be determined based on diversity scores, quality scores, and/or other information. One or more of the segments included in a given highlight segment set may be determined based on a quality score. Other segments included in the given highlight segment set may be determined based on a diversity score and/or other information. As such, the content segments included in a highlight segment set may be selected to be diverse and/or have a given level of quality. Manual user selection of content segments from content segment sets that should be included in a highlight segment set may be cumbersome, time consuming, and inefficient. Selecting a highlight segment set according to other, non-manual methods (e.g., using a specialized computer programmed to select segments that meet a given set of criteria) may lead to highlight segment sets that include content segments that are too similar because they all satisfy the same set of criteria. Therefore, such existing systems and/or methods fail to determine highlight segment sets that represent high quality, and diverse highlight(s) of the content segment set as a whole.

In some implementations, the system may include one or more physical processors configured by machine-readable instructions. Executing the machine-readable instructions may cause the one or more physical processors to determine highlight segment sets. The machine-readable instructions may include one or more computer program components. The machine-readable instructions may include one or more of a content component, a highlight set component, a selection component, a diversity component, a disqualification component, a graph component, and/or other components.

The content component may be configured to obtain one or more content files. The content files may define content in content segment sets. The content segment sets may include one or more video segments, images, audio segments, and/or other content. The content segment sets may include a first content segment set. The first content segment set may include a first content segment, a second content segment, and/or other content segments.

The highlight set component may be configured to determine individual highlight segment sets of content segments from the content segment sets. The highlight set component may be configured to determine a first highlight segment set of content segments included in the first content segment set.

Determining a first highlight segment set of content segments included in the first content segment set may include (a) selecting an individual content segment included in the first content segment set. The selection component may be configured to select an individual content segment included in the first content segment set as a selected content segment for inclusion in the first highlight segment set. The selection component may select the individual content segment based on one or more selection criteria. The selection criteria may include a first selection criterion. In some implementations, the first selection criterion may include a quality score and/or other criteria. In some implementations, the first content segment may be selected by the selection component for a first iteration based on the first selection criterion.

Determining a first highlight segment set of content segments included in the first content segment set may include (b) determining one or more diversity scores for content segments. The diversity component may be configured to determine diversity scores for content segments that are (i) included in the first content segment set and (ii) not yet selected for inclusion in the first highlight segment set. The one or more diversity scores may indicate a level of similarity between the individual content segments not yet selected for inclusion in the first highlight segment set and the selected content segment selected at operation (a) (by the highlight set component).

The diversity component may be configured to determine the one or more diversity scores based on one or more of visual similarity, temporal similarity, semantic similarity, emotive similarity, and/or other types of similarity between the individual content segments not yet selected for inclusion in the first highlight segment set and the selected content segment selected at operation (a). As such, for a first iteration of the steps and/or operations for determining the first highlight segment set (e.g., steps (a)-(c) and/or other steps), the first diversity score may be determined based on the visual similarity, the temporal similarity, the semantic similarity, the emotive similarity, and/or other types of similarity between the second content segment and the first content segment.

In some implementations, wherein the first content segment set includes a first content segment, a second content segment, a third content segment, a fourth content segment, and/or other content segments. The diversity component may be configured to determine one or more of a second diversity score for the third content segment, a third diversity score for the fourth content segment, and/or other diversity scores for the other content segments. Thus, determining one or more diversity scores for a first iteration of (b) may include determining a second diversity score for the third content segment, determining a third diversity score for the fourth content segment, and/or determining other diversity scores for other content segments.

Determining a first highlight segment set of content segments included in the first content segment set may include (c) disqualifying one or more of the content segments for inclusion in the first highlight segment set. The disqualification component may be configured to disqualify one or more of the content segments for inclusion in the first highlight segment set for future iterations. One or more of the content segments may be disqualified for inclusion in the first highlight segment set for future iterations based on the one or more diversity scores. For example, for a first iteration, the second content segment may be disqualified for inclusion in the first highlight segment set for the future iterations based on the first diversity score.

The disqualification component may be configured to disqualify the second segment based on the first diversity score being below a threshold diversity score. The threshold diversity score may represent an amount of diversity required between the segment included in the first content segment set and the control segment (e.g., the content segment selected at operation (a) by the selection component. In some implementations, wherein a second diversity score for the third content segment and a third diversity score for the fourth content segment may be determined by the diversity component, the disqualification component may be configured to disqualify the third content segment for inclusion in the first highlight segment set for future iterations responsive to the first diversity score and/or the second diversity score being below a threshold diversity score. In some implementations, disqualification component may be configured to disqualify the second content segment based on the first diversity score being less than other diversity scores for other content segments in the first content segment set.

Determining a first highlight segment set of content segments included in the first content segment set may include iterating (a)-(c), and/or other steps and/or operations, for multiple iterations. Highlight set component may be configured to iterate (a)-(c) to determine the first highlight segment set. In some implementations, highlight set component may be configured to iterate (a)-(c) until a threshold number of content segments are selected for inclusion in the first highlight segment set. The highlight set component may be configured to iterate (a)-(c) until there are no content segments remaining in the first content segment set that are not disqualified or included in the first highlight segment set.

In some implementations, the graph component may be configured to generate a graphical representation of attributes of one or more of the second content segment, a third content segment, a fourth content segment, and/or other content segments. The graphical representation may be generated based on one or more of the first diversity score, a second diversity score determined for the third content segment, a third diversity score determined for the fourth content segment, and/or other diversity scores determined for other content segments.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
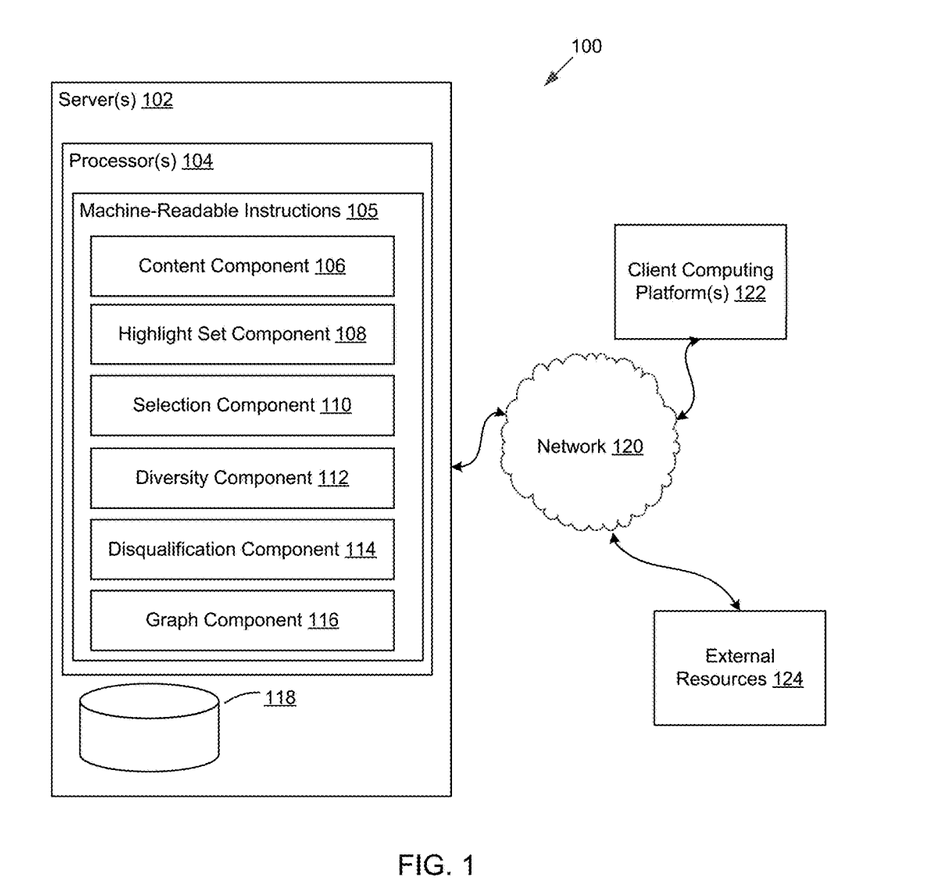
FIG. 1 illustrates a system configured to determine highlight segment sets, in accordance with one or more implementations.

FIG. 1 illustrates a system 100 configured to determining highlight segment sets. Highlight segment sets may be determined based on one or more of diversity scores, quality scores, and/or other information. As such, highlight segment sets may include high quality content segments from the content segment set that are also diverse and represent a wide variety of content included in the content segment sets. Selecting highlights manually from large content segment sets may not be feasible because it would require a user to individually review every content segment in the set to select highlight segments. Other automated methods for selecting highlight segments may select highlight segments according to the same criteria such that all of the highlight segments selected are very similar and may not represent the range of diverse content included in the content segment sets. One aspect of the present disclosure describes determining highlight segment sets based on diversity such that the highlight segments selected may have a high quality and/or be diverse.

The system 100 may comprise one or more of a server 102, one or more computing platforms 122, and/or other components. Individual ones of the client computing platforms 122 may include one or more of a cellular telephone, a smartphone, a digital camera, a laptop, a tablet computer, a desktop computer, a television set-top box, smart TV, a gaming console, a client computing platform, and/or other platforms.

The server 102 may include one or more physical processor(s) 104 configured by machine-readable instructions 105. Processor(s) 104 may be configured to provide information processing capabilities in system 100. As such, processor(s) 104 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor(s) 104 may be configured by machine-readable instructions 105. Executing machine-readable instructions 105 may facilitate determining highlight segment sets. Machine-readable instructions 105 may include one or more computer program components. The machine-readable instructions 105 may include one or more of a content component 106, a highlight set component 108, a selection component 110, a diversity component 112, a disqualification component 114, a graph component 116, and/or other components.

One or more features and/or functions of server 102 may be configured to facilitate generation, obtaining, processing, analyzing, editing, and/or distribution of content files. Content files may define content in content segment sets. Content may include one or more types of media items. For example, content may include one or more of video content, image content, audio content, and/or other media items. Obtaining content files may include obtaining one or more of video files (e.g., video clips, video segments, full videos, and/or other video files, audio files (e.g., music, podcasts, audio books, and/or other audio files), documents, photos, multimedia presentations, digital purchases of goods and services, and/or other media items. In some implementations, photos may be associated with one or more of multi-shot photo modes, time-lapse modes, and/or burst shot modes of a camera. The content segment sets may include one or more video segments, images, audio segments, and/or other content segments.

Users of system 100 may comprise individuals and/or entities that provide, generate, process, analyze, edit, and/or distribute one or more of videos, video clips, and/or other media items. Individual videos may comprise continuous capture video, a compilation of video clips, and/or other videos. By way of non-limiting example, system 100 may be configured to receive videos captured by users.

Content component 106 may be configured to obtain content files. The content files may define content in content segment sets. The content segment sets may include one or more video segments, images, audio segments, and/or other content. The content segment sets may include a first content segment set. The first content segment set may include a first content segment, a second content segment, and/or other content segments. Content component 106 may be configured to obtain one or more electronic files defining the content included in the content segment sets from one or more of electronic storage 118, client computing platforms 122, external resources 124, and/or other sources. The content may be captured by one or more capturing devices from which the information defining one or more of video content, images, audio content, metadata, and/or other content in the content files may be uploaded and/or transmitted to one or more of electronic storage 118, client computing platforms 122, external resources 124, and/or other sources.

The content segment sets may include any quantity of content segments. The content segments included in a given content segment set may be different types of content segments or the same type of content segments. By way of non-limiting example, a first content segment set may include multiple video segments, and/or a second content segment set may include one or more video segments, audio segments, and/or images.

Highlight set component 108 may be configured to determine individual highlight segment sets of content segments. The individual highlight segment sets of content segments may be determined from one or more content segment sets. A highlight segment set may include one or more content segments that represent highlights of the content included in the content segment sets. By way of non-limiting example, a highlight segment set may include multiple highlight frames (e.g., content segments) from a video having multiple frames (e.g., a set of content segments). By way of another non-limiting example, the highlight segment set may include one or more video segments and/or audio segments (e.g., content segments) from one or more sets of video segments, audio segments, and/or images. Highlight set component 108 may be configured to determine a first highlight segment set of content segments included in the first content segment set. Determining the first highlight segment set of content segments may include iterating one or more steps for multiple iterations. The one or more steps iterated for multiple iterations may include (a) selecting an individual content segment based on one or more selection criteria, (b) determining one or more diversity scores for content segments in a content segment set that are not yet selected, (c) disqualifying one or more of the content segments in the content segment set based on one or more diversity scores, and/or other steps and/or operations.

Determining a first highlight segment set of content segments included in the first content segment set may include (a) selecting an individual content segment included in the first content segment set. Selection component 110 may be configured to select an individual content segment included the first content segment set as a selected content segment for inclusion in the first highlight segment set. Selecting an individual content segment for inclusion in a highlight segment set may include associating the selected content segment with the highlight segment set, moving the selected highlight segment from the content segment set to the highlight segment set, marking the selected highlight segment as included in the highlight segment set, and/or otherwise selecting an individual content segment for inclusion in the highlight segment set. The selection component may select the individual content segment based on selection criterion. The selection criterion including a first selection criterion. As such, for a first iteration, the first content segment may be selected for inclusion in the first highlight segment set based on the first selection criterion. In some implementations, the first selection criterion may include a quality score, and/or other criteria. A quality score of an individual content segment may be based on one or more of the quality of the content, a resolution, brightness, contrast, color histogram, blur/sharpness, number of human faces present, the generating/capturing device, features of scenes within the content (e.g., feature points, objects, faces, colors, scene compilation, and/or other scene features), capture parameters (e.g., a resolution, a frame rate, one or more lens settings, and/or other capture parameters), motion in the image (e.g., global motion, local motion, and/or other motion), and/or other factors.

In some implementations, a user may select, define, and/or indicate one or more criteria for selecting the individual content segment. The one or more criteria may indicate the individual content segment should be included in the highlight content segment set. In some implementations, an individual content segment may be selected from the first content segment set to be included in the first highlight segment set for individual ones of the iterations performed to determine the first highlight segment set.

Determining a first highlight segment set of content segments included in the first content segment set may include (b) determining one or more diversity scores for content segments. Diversity component 112 may be configured to determine diversity scores for content segments that are (i) included in the first content segment set and (ii) not yet selected (e.g., by selection component 110 at (a)) for inclusion in the first highlight segment set. The one or more diversity scores may indicate a level of similarity between the individual content segments not yet selected for inclusion in the first highlight segment set and the selected content segment selected at operation (a). Diversity component 112 may be configured to compare the individual content segment selected to the other content segments included in the first content segment set that are not yet selected for inclusion in the first highlight segment set. The one or more diversity scores may be determined on a segment by segment basis for the segments included in the first content segment set but not yet selected for inclusion in the first highlight segment set. As such, diversity component 112 may be configured to determine a diversity score for one of the content segments based on its comparison with the individual content segment selected in (a). Such a determination may be repeated for the individual content segments included in the first content segment set that are not yet selected for inclusion in the first highlight segment set.

Diversity component 112 may be configured to determine the one or more diversity scores based on one or more of visual similarity, temporal similarity, semantic similarity, emotive similarity, and/or other types of similarity between the individual content segments not yet selected for inclusion in the first highlight segment set and the selected content segment selected at operation (a) (e.g., by selection component 110).

Visual similarity may indicate how similar two or more content segments (e.g., video segments, images, etc.) are to one another visually. Visual similarity may be determined based on comparisons of visual content and/or objects included and/or depicted within the individual content segments. In some implementations, determining visual similarity may include determining similarities of one or more of color, hue, saturation, brightness, light, edge orientation of the content and/or objects within the content segments, and/or other visual aspects associated with the content and/or objects included and/or depicted within the individual content segments. Similarities of individual visual content sets may be determined per frame, per pixel, per content segment, and/or otherwise. Visual similarity may be determined according to one or more of the methods described herein and/or any other method for determining visual similarity between two or more content segments.

By way of non-limiting example, visual similarity between one or more content segments may be determined based on feature vectors of sequential pairs of the individual content segments, and/or other information. Feature vectors may include a first feature vector characterizing a local binary pattern distribution of the individual images, a second feature vector characterizing a color distribution of the individual images, and/or other feature vectors. A feature vector comparison may include a function that compares two feature vectors of separate images and returns a Boolean (e.g., one or more thresholds are applied to determine whether the images are "similar" or "not similar"). As such, in one non-limiting example, visual similarity may be determined by using systems and/or methods described in U.S. patent application Ser. No. 14/920,375, entitled "SYSTEMS AND METHODS FOR IDENTIFYING A GROUP OF IMAGES," filed Oct. 22, 2015, the foregoing being incorporated herein by reference in its entirety. Determining visual similarity is by no means limited to the use case example provided herein and may be determined according to other methods for determining visual similarity between two or more content segments.

In some implementations, diversity component 112 may be configured to determine visual similarity between the individual content segments not yet selected for inclusion in the first highlight segment set and the selected content segment selected at operation (a). In some implementations, diversity component 112 may be configured to obtain information indicating the visual similarity between the individual content segments not yet selected for inclusion in the first highlight segment set and the selected content segment selected at operation (a). Information indicating the visual similarity may be obtained from one or more sources such as: electronic storage 118, external resources 124, client computing platforms 122, and/or other sources.

Temporal similarity may indicate how close two or more content segments are to one another in time. How close two or more content segments are to one another in time may include, for example, how close together two content segments within the same video are together relative to the duration of the video, how close the time at which one content segment was captured is compared to the time at which another content segment was captured, how close the duration of one content segment is with the duration of another content segment, and/or other indications of how close two or more content segments are to one another in time.

In some implementations, diversity component 112 may be configured to determine temporal similarity between the individual content segments not yet selected for inclusion in the first highlight segment set and the selected content segment selected at operation (a); and/or diversity component 112 may be configured to obtain information indicating the temporal similarity between the individual content segments not yet selected for inclusion in the first highlight segment set and the selected content segment selected at operation (a). Information indicating the temporal similarity may be obtained from one or more sources such as: electronic storage 118, external resources 124, client computing platforms 122, and/or other sources. By way of non-limiting example, information indicating the temporal similarity may include metadata associated with individual ones of the content segments not yet selected for inclusion in the first highlight segment set and the selected content segment selected at operation (a).

Semantic similarity may indicate whether two or more content segments exhibit and/or display similar objects. Objects may include items and/or sounds depicted (e.g., faces, objects, scenery, etc.) and/or otherwise present (e.g., audible, etc.) within a content segment. In some implementations, diversity component 112 may be configured to determine semantic similarity between the individual content segments not yet selected for inclusion in the first highlight segment set and the selected content segment selected at operation (a); and/or diversity component 112 may be configured to obtain information indicating the semantic similarity between the individual content segments not yet selected for inclusion in the first highlight segment set and the selected content segment selected at operation (a). Information indicating the semantic similarity may be obtained from one or more sources such as: electronic storage 118, external resources 124, client computing platforms 122, and/or other sources. By way of non-limiting example, information indicating the temporal similarity may include metadata associated with individual ones of the content segments not yet selected for inclusion in the first highlight segment set and the selected content segment selected at operation (a).

Emotive similarity may indicate whether two or more content segments evoke, are likely to evoke, and/or are intended to evoke similar emotions in viewers. Emotive similarity may be determined based on one or more objects, colors, brightness, saturation, light, and/or other characteristics of the content segment. The one or more characteristics of the content segment T and/or associated with one or more types of emotions.

By way of non-limiting example, one or more content segments may be classified based on the emotions they evoke (e.g. warm, cold, scary, joy, mundane, excitement, etc.). In some implementations, content segments that belong to the same category may be emotively similar. Content segments may be classified by a machine learning approach based on a corpus of segments manually labelled as belonging to one or more emotive categories. A classifier may be trained based on the labelled segments.

One example may include using a segment's image sequence of pixels to feed into a deep neural network (e.g. convolutional neural network), augmented with a mechanism to capture temporal information (e.g., a long short-term memory (LSTM)), in order to determine the emotive category. As such, it may not be necessary to dictate to the system 'based on what factors' to learn the emotive categories from. Instead, the deep neural network may learn directly from the raw pixels.

In some implementations, diversity component 112 may be configured to determine emotive similarity between the individual content segments not yet selected for inclusion in the first highlight segment set and the selected content segment selected at operation (a); and/or diversity component 112 may be configured to obtain information indicating the emotive similarity between the individual content segments not yet selected for inclusion in the first highlight segment set and the selected content segment selected at operation (a). Information indicating the emotive similarity may be obtained from one or more sources such as: electronic storage 118, external resources 124, client computing platforms 122, and/or other sources.

The visual similarity, temporal similarity, semantic similarity, emotive similarity, and/or other types of similarity determined may be represented by a metric. The metric may include one or more of a value, quantity, level, characteristic, keyword, and/or other indications of an amount of similarity. Diversity component 112 may be configured to determine diversity scores for content segments by combining one or more of the metrics for one or more of a visual similarity, temporal similarity, semantic similarity, emotive similarity, and/or other types of similarity. By way of non-limiting example, a first diversity score for the second content segment may be determined by combining one or more metrics indicating one or more of visual similarity, temporal similarity, semantic similarity, emotive similarity, and/or other types of similarity between the second content segment (e.g., a content segment (i) included in the first content segment set and/or (ii) not yet selected for inclusion in the first highlight segment set) and the first content segment (e.g., the content segment selected by selection component 110). Combining one or more metrics indicating one or more types of similarities may include adding, averaging, weighting (e.g., one or more of the types of similarities may be weighted in a combination to have more and/or less of an influence on the diversity score), and/or otherwise combining one or more of the metrics. In some implementations, the diversity score may include an inverse and/or other representation of the combination of one or more of the metrics indicating one or more of the types of similarity. As such, for example, high similarity metrics may combine to form a low diversity score. In some implementations, the types of similarities may be treated separately from one another. Within a given type of similarity, one or more metrics may be added, averaged, weighted, and/or otherwise combined to determine a diversity score.

As such, for a first iteration of (a)-(c), diversity scores may be determined based on the visual similarity, the temporal similarity, the semantic similarity, the emotive similarity, and/or other types of similarity between individual ones of the content segments in the first content segment set (e.g., including the second content segment, and/or other content segments in the first content segment set) and the first content segment.

In some implementations, wherein the first content segment set includes a first content segment, a second content segment, a third content segment, a fourth content segment, and/or other content segments, diversity component 112 may be configured to determine diversity scores for the second content segment, the third content segment, the fourth content segment, and/or other content segments. As such, in some implementations, diversity component 112 may be configured to determine, for a first iteration of (a)-(c), a first diversity score for the second segment indicating a level of similarity between the second content segment and the first content segment; a second diversity score for the third content segment indicating a level of similarity between the third content segment and the first content segment; a third diversity score for the fourth content segment indicating a level of similarity between the fourth content segment and the first content segment; and/or other diversity scores for the other content segments indicating a level of similarity between another content segment and the first content segment. Thus, determining one or more diversity scores for a first iteration of (b) may include determining a second diversity score for the third content segment, determining a third diversity score for the fourth content segment, and/or determining other diversity scores for other content segments.

Determining a first highlight segment set of content segments included in the first content segment set may include (c) disqualifying one or more of the content segments for inclusion in the first highlight segment set. Disqualification component 114 may be configured to disqualify one or more of the content segments for inclusion in the first highlight segment set for future iterations. Disqualifying one or more of the content segments for inclusion in the first highlight segment set for future iterations may include one or more of associating the disqualified segments with a discarded content segment set, marking the disqualified content segments as disqualified, deleting the disqualified content segments from the first content segment set, disassociating the disqualified content segments with the first content segment set, and/or otherwise disqualifying the one or more content segments for inclusion in the first highlight segment set for future iterations.

Disqualification component 114 may be configured to disqualify one or more of the content segments for inclusion in the first highlight segment set for future iterations based on the one or more diversity scores. In some implementations, the second content segment may be disqualified for inclusion in the first highlight segment set for the future iterations based on the first diversity score. Disqualification component 114 may be configured to disqualify one or more content segments based on their corresponding diversity scores being below a threshold diversity score. The threshold diversity score may represent an amount of diversity required between the segment included in the first content segment set and the control segment (e.g., the content segment selected at operation (a) by the selection component. In some implementations, the threshold diversity score may indicate a minimum level of diversity, compared to the selected content segment, a given content segment is required to have not to be disqualified for inclusion in the first highlight segment set. Disqualification component 114 may be configured to disqualify the second content segment based on the first diversity score being less than other diversity scores for other content segments in the first content segment set. As such, by way of non-limiting example, the content segment having the lowest diversity score for a given iteration, may be disqualified from the first content segment set.

Diversity component 112 may be configured to disqualify the second segment based on the first diversity score being below a threshold diversity score. In some implementations, content segments having diversity scores above a given threshold diversity score may be included in the first highlight segment set.

In some implementations, wherein diversity component 112 is configured to determine a second diversity score for the third content segment and a third diversity score for the fourth content segment, disqualification component 114 may be configured to disqualify the third content segment for inclusion in the first highlight segment set for future iterations responsive to the first diversity score and/or the second diversity score being below a threshold diversity score.

Figure 2:
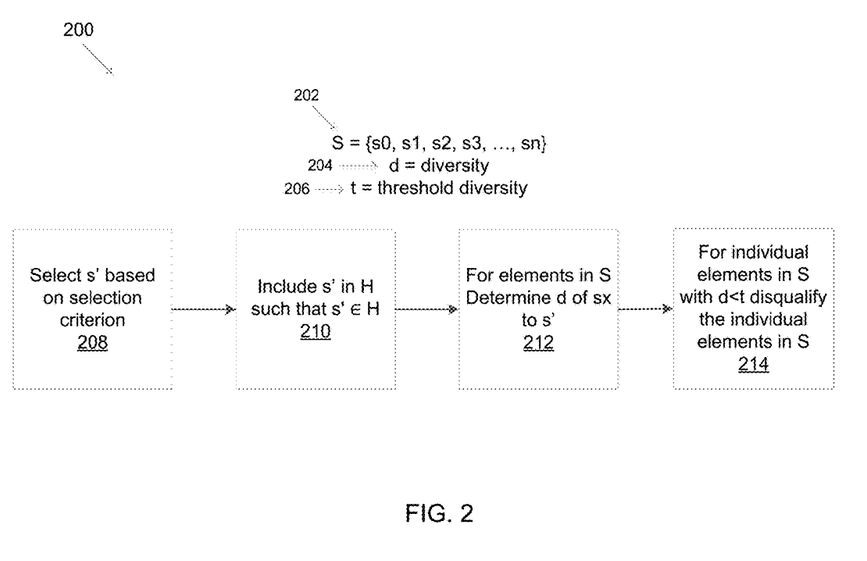
FIG. 2 illustrates a flow chart for determining highlight segment sets, in accordance with one or more implementations.

FIG. 2 illustrates a flow chart for determining highlight segment sets, in accordance with one or more implementations. Flow chart 200 illustrates a content segment set S 202 having multiple content segments {s0, s1, s2, s3, . . . sn} as elements within set S 202. At 208, s' may be selected based on selection criteria. The selection of s' may be for inclusion in a highlight segment set H. At 210, s' may be included in highlight segment set H such that s' is an element of highlight segment set H. At 212, for the elements in content segment set S 202, diversity d 204 of sx to s' may be determined. In some implementations, d of sx to s' may be determined for all elements (e.g., all x including 0, 1, 2, 3, etc.) As such, for example, diversity of the remaining elements in content segment set 202 not selected at 208, compared to s' (e.g., selected content segment) may be determined. At 214, for one or more individual elements in S where diversity d 204 is less than threshold diversity t 206, the one or more individual elements in content segment set S 202 may be disqualified.

Returning to FIG. 1, determining a first highlight segment set of content segments included in the first content segment set may include iterating (a)-(c), and/or other steps and/or operations, for multiple iterations. Multiple iterations may include any number of iterations. In some implementations, the quantity of iterations may be determined and/or set by a user. As such, the multiple iterations may stop after a given quantity of iterations has been performed. Highlight set component 108 may be configured to iterate (a)-(c) to determine the first highlight segment set. In some implementations, highlight set component 108 may be configured to iterate (a)-(c) until a threshold number of content segments are selected for inclusion in the first highlight segment set. As such, highlight set component may iterate (a)-(c) until the first highlight segment set is full (e.g., has a threshold number of content segments). The threshold number of content segments may be determined and/or set by a user (e.g., obtained by highlight set component), and/or otherwise determined by highlight set component 108. In some implementations, the highlight set component may be configured to iterate (a)-(c) until there are no content segments remaining in the first content segment set that are not disqualified or included in the first highlight segment set.

Figure 3:
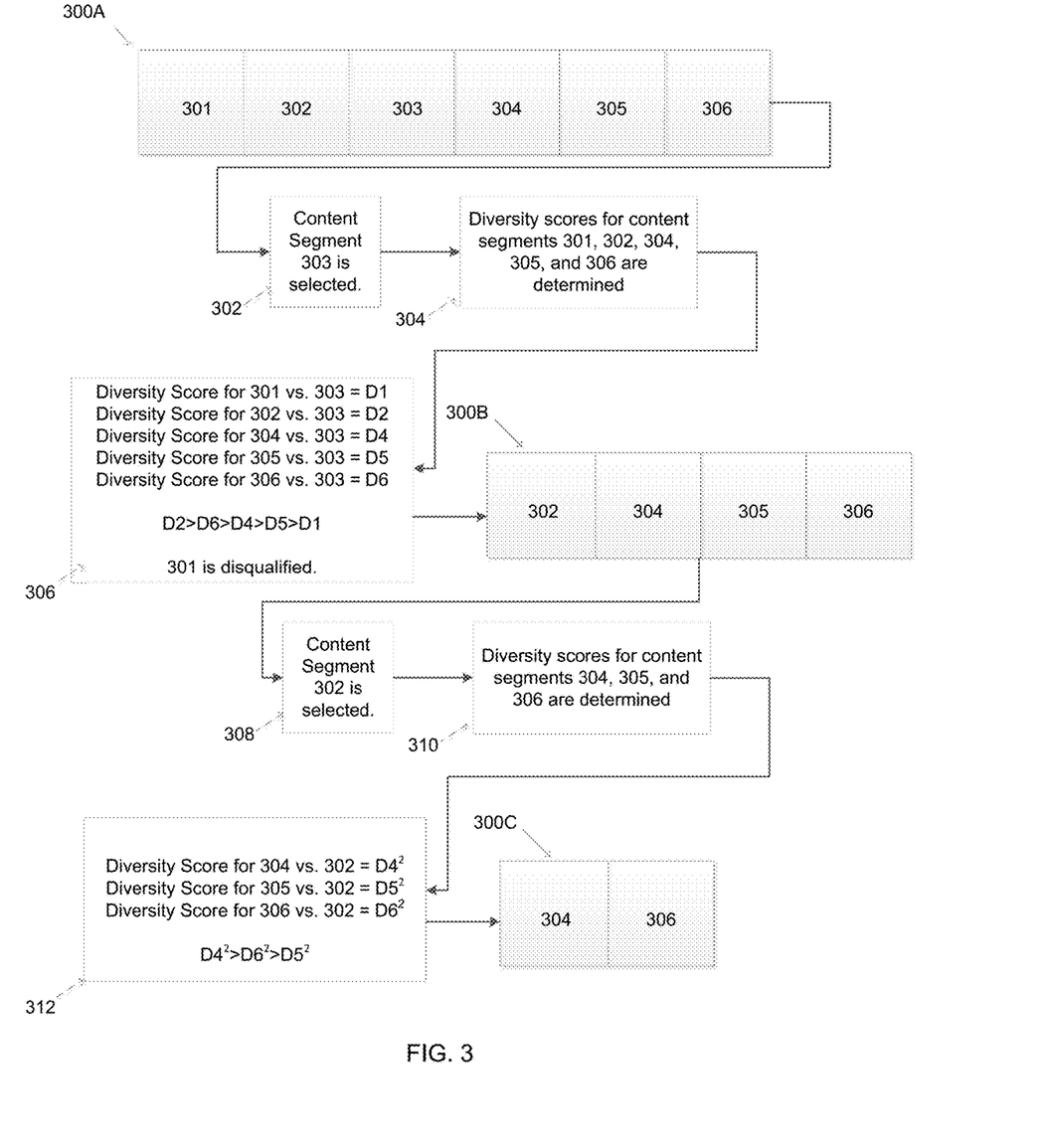
FIG. 3 illustrates a content segment set including multiple content segments and flow chart for determining a highlight segment set, in accordance with one or more implementations.

FIG. 3 illustrates a content segment set including multiple content segments and flow chart for determining a highlight segment set via multiple iterations, in accordance with one or more implementations. Content segment set 300A may include six content segments (e.g., 301, 302, 303, 304, 305, and 306). At 302, for a first iteration, content segment 303 may be selected for inclusion in a highlight segment set. Content segment 303 may be selected based on a first criterion. At 304, diversity scores for the content segments included in content segment set 300A and not yet selected for inclusion in the highlight segment (e.g., content segments 301, 302, 304, 305, and 306) set may be determined. At 306, the diversity scores D1, D2, D4, D5, and D6 may be compared to identify the lowest diversity score. Content segment 301 may be disqualified at 306 based on diversity score D1 (indicating a high similarity between segment 301 and segment 303). In some implementations, content segment 301 may be disqualified at 306 based on diversity score D1 (indicating a high similarity between segment 301 and segment 303) not meeting a required diversity threshold 'D'.

Content segment set 300B may include the content segment set at the start of a second iteration. Content segment set 300B may include four content segments (e.g., 302, 304, 305, and 306) remaining after content segment 303 was included in the highlight content set and segment 301 was disqualified. At 308, for a second iteration, content segment 302 may be selected for inclusion in the highlight segment set. Content segment 302 may be selected based on the first criterion and/or other criterion. At 310, diversity scores for the content segments included in content segment set 300B and not yet selected for inclusion in the highlight segment (e.g., content segments $304^2$, $305^2$, and $306^2$) set may be determined. At 312, the diversity scores D4, D5, and D6 may be compared to identify the lowest diversity score. Segment 305 may be disqualified at 312 based on diversity score D5 indicating a high similarity between segment 305 and segment 302. In some implementations, content segment 305 may be disqualified at 312 based on diversity score D5 not meeting a required diversity threshold 'D'. Content segment set 300C may include the content segment set at the start of a third iteration if performed (not illustrated). Content segment set 300C may include two content segments (e.g., 304 and 306) remaining after content segment 302 was included in the highlight content set and segment 305 was disqualified.

Returning to FIG. 1, in some implementations, graph component 116 may be configured to generate a graphical representation of attributes of one or more of the second content segment, a third content segment, a fourth content segment, and/or other content segments. The attributes of one or more of the content segments may include the diversity scores, a quality score, one or more types of similarity metrics, and/or other attributes of the content segments. The graphical representation may include one or more of a graph, chart, plot, image, and/or other graphical representation. Graph component 116 may be configured to generate a graphical representation based on one or more of the first diversity score, a second diversity score determined for the third content segment, a third diversity score determined for the fourth content segment, and/or other diversity scores determined for other content segments.

Although processor(s) 104 is shown in FIG. 1 as a single entity, this is for illustrative purposes only. In some implementations, processor(s) 104 may comprise a plurality of processing units. These processing units may be physically located within the same device, or processor(s) 104 may represent processing functionality of a plurality of devices operating in coordination. Processor(s) 104 may be configured to execute one or more components by software; hardware; firmware; some combination of software, hardware, and/or firmware; and/or other mechanisms for configuring processing capabilities on processor(s) 104.

It should be appreciated that although computer components are illustrated in FIG. 1 as being co-located within a single processing unit, in implementations in which processor(s) 104 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 106, 108, 110, 112, 114, and/or 116 may be eliminated, and some or all of its functionality may be provided by other computer program components. As another example, processor(s) 104 may be configured to execute one or more additional computer program components that may perform some or all of the functionality attributed to one or more of computer program components 106, 108, 110, 112, 114, and/or 116 described herein.

The electronic storage media of electronic storage 118 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 118 may be a separate component within system 100, or electronic storage 118 may be provided integrally with one or more other components of system 100 (e.g., processor(s) 104). Although electronic storage 118 is shown in FIG. 1 as a single entity, this is for illustrative purposes only. In some implementations, electronic storage 118 may comprise a plurality of storage units. These storage units may be physically located within the same device, or electronic storage 118 may represent storage functionality of a plurality of devices operating in coordination.

Figure 4:
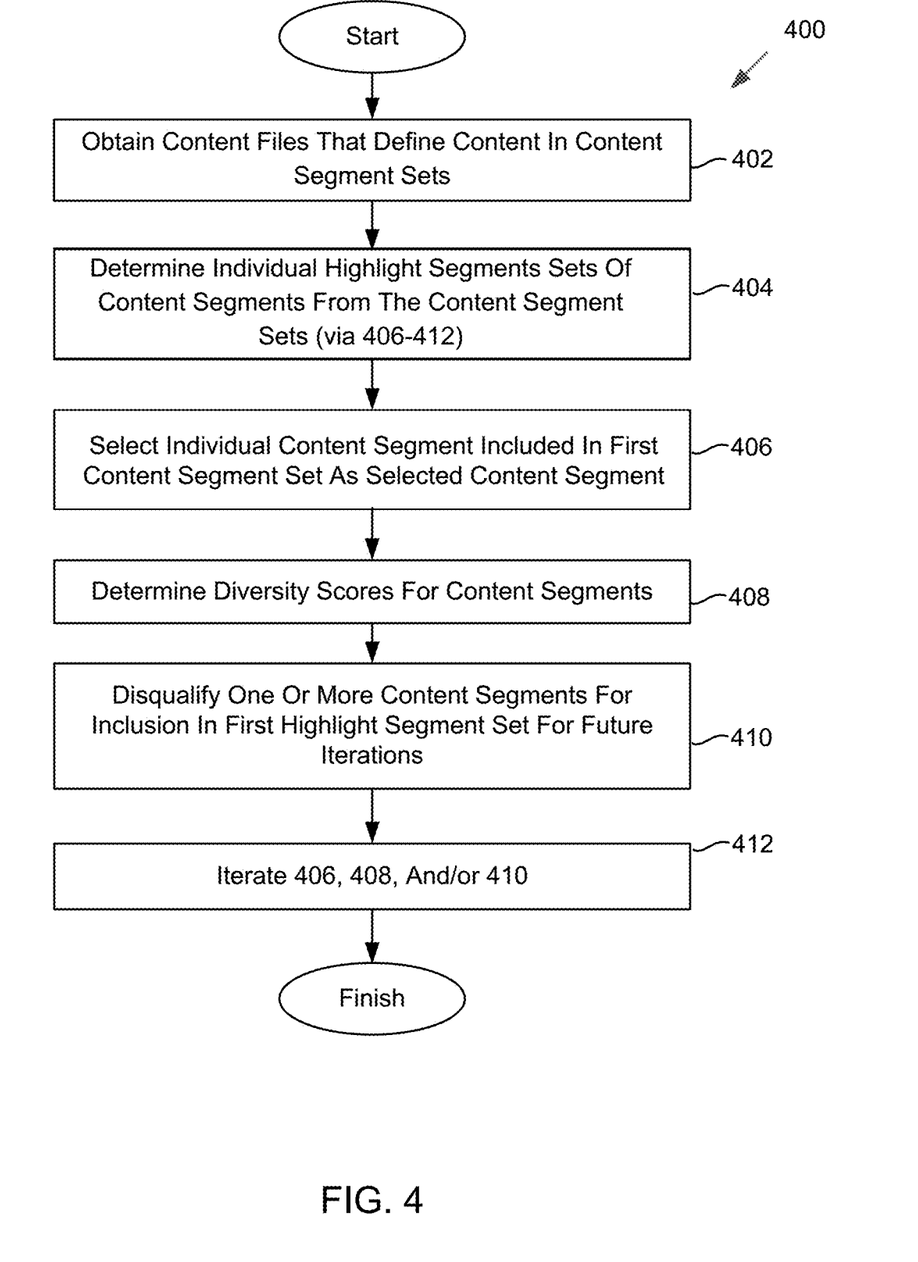
FIG. 4 illustrates a method for determining highlight segment sets, in accordance with one or more implementations.

FIG. 4 illustrates a method for determining highlight segment sets, in accordance with one or more implementations. The operations of method 400 presented below are intended to be illustrative. In some implementations, method 400 may be accomplished with one or more additional operations not described, and/or without one or more of the operations discussed. In some implementations, two or more of the operations may occur substantially simultaneously.

In some implementations, method 400 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 400 in response to instructions stored electronically on one or more electronic storage mediums. The one or more processing devices may include one or more devices configured through hardware, firmware, and/or software to be specifically designed for execution of one or more of the operations of method 400.

Referring to FIG. 4 and method 400, at operation 402, content files may be obtained. The content files may define content in content segment sets. The content segment sets may include a first content segment set. The first content segment set may include a first content segment, a second content segment, and/or other content segments. In some implementations, operation 402 may be performed by a content component the same as or similar to content component 106 (shown in FIG. 1 and described herein).

At operation 404, individual highlight segment sets of content segments may be determined from the content segment sets. Determining a first highlight segment set of content segments included in the first content segment set may include performing operations 406, 408, and/or 410 for multiple iterations to determine the first highlight segment set. In some implementations, operation 404 may be performed by a highlight set component the same as or similar to highlight set component 108 (shown in FIG. 1 and described herein).

At operation 406, an individual content segment included in the first content segment set may be selected as a selected content segment for inclusion in the first highlight segment set. The individual content segment may be selected as the selected content segment based on selection criterion. The selection criterion may include a first selection criterion. In some implementations, operation 406 may be performed by a selection component the same as or similar to selection component 110 (shown in FIG. 1 and described herein).

At operation 408, diversity scores for content segments that are (i) included in the first content segment set and/or (ii) not yet selected for inclusion in the first highlight segment set may be determined. The one or more diversity scores may indicate a level of similarity between the individual content segments not yet selected for inclusion in the first highlight segment set, and the selected content segment selected at operation 406. In some implementations, operation 408 may be performed by a diversity component the same as or similar to diversity component 112 (shown in FIG. 1 and described herein).

At operation 410, one or more of the content segments may be disqualified for inclusion in the first highlight segment set for future iterations. One or more of the content segments may be disqualified for inclusion in the first highlight segment set based on the one or more diversity scores. In some implementations, operation 410 may be performed by a disqualification component the same as or similar to disqualification component 114 (shown in FIG. 1 and described herein).

At operation 412, operations 406, 408, and/or 410 may be iterated to determine a first highlight segment set of content segments included in the first content segment set. Operations 406, 408, and/or 410 may be iterated for multiple iterations to determine the first highlight segment set. In some implementations, operation 412 may be performed by a highlight set component the same as or similar to highlight set component 108 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured for determining highlight segment sets, the system comprising:
one or more processors configured by machine-readable instructions to:
obtain content files that define content in content segment sets, the content segment sets including a first content segment set that includes a first content segment and a second content segment;
determine individual highlight segment sets of content segments from the content segment sets, wherein determining a first highlight segment set of content segments included in the first content segment set includes:
(a) selecting an individual content segment included in the first content segment set as a selected content segment for inclusion in the first highlight segment set based on selection criterion, the selection criterion including a first selection criterion;
(b) determining diversity scores for content segments that are (i) included in the first content segment set and (ii) not yet selected for inclusion in the first highlight segment set, the diversity scores indicating a level of similarity between the individual content segments not yet selected for inclusion in the first highlight segment set and the selected content segment selected at operation (a); and
(c) disqualifying one or more of the content segments for inclusion in the first highlight segment set for future iterations based on the diversity scores,
iterate (a)-(c) for multiple iterations to determine the first highlight segment set.

2. The system of claim 1, wherein the one or more processors are further configured by machine-readable instructions to iterate (a)-(c) until a threshold number of content segments are selected for inclusion in the first highlight segment set.

3. The system of claim 1, wherein the one or more processors are further configured by machine-readable instructions to iterate (a)-(c) until there are no content segments remaining in the first content segment set that are not disqualified or included in the first highlight segment set.

4. The system of claim 1, wherein the diversity scores are determined based on visual similarity, temporal similarity, and semantic similarity between the individual content segments not yet selected for inclusion in the first highlight segment set and the selected content segment selected at operation (a), such that for a first iteration of (a)-(c), a first diversity score is determined based on the visual similarity, the temporal similarity, and the semantic similarity between the second content segment and the first content segment.

5. The system of claim 4, wherein the diversity scores are further determined based on emotive similarity between the individual content segments not yet selected for inclusion in the first highlight segment set and the selected content segment selected at operation (a), such that for a first iteration of (a)-(c), the first diversity score is further determined based on the emotive similarity between the second content segment and the first content segment.

6. The system of claim 1, wherein the second content segment is disqualified at the first iteration based on a first diversity score determined for the second content segment being below a threshold diversity score, the first diversity score indicating the level of similarity between the second content segment and the first content segment.

7. The system of claim 1, wherein the first content segment set includes the first content segment, the second content segment, a third content segment, and a fourth content segment, such that determining diversity scores for a first iteration of (b) includes determining a first diversity score for the second content segment, determining a second diversity score for the third content segment, and determining a third diversity score for the fourth content segment,
wherein the first diversity score for the second content segment is determined based on the visual similarity, the temporal similarity, and the semantic similarity between the second content segment and the first content segment, the second diversity score for the third content segment is determined based on the visual similarity, the temporal similarity, and the semantic similarity between the third content segment and the first content segment, and wherein the third diversity score for the fourth content segment is determined based on the visual similarity, the temporal similarity, and the semantic similarity between the fourth content segment and the first content segment.

8. The system of claim 7, wherein responsive to the first diversity score and the second diversity score being below a threshold diversity score for the first iteration, the one or more processors are further configured by machine-readable instructions to disqualify the second content segment and the third content segment for inclusion in the first highlight segment set for future iterations.

9. The system of claim 1, wherein the one or more processors are configured by machine-readable instructions to:
generate a graphical representation of attributes of one or more of the second content segment, a third content segment, and/or a fourth content segment based on one or more of a first diversity score determined for the second content segment, a second diversity score determined for the third content segment, and a third diversity score determined for the fourth content segment;
wherein one or more of the content segments are disqualified for inclusion in the first highlight segment set for future iterations based on the graphical representation.

10. The system of claim 1, wherein the second content segment is disqualified during a first iteration based on a first diversity score determined for the second content segment being less than other diversity scores for other content segments in the first content segment set, wherein the first diversity score for the first iteration indicates the level of similarity between the second content segment and the first content segment.

11. The system of claim 1, wherein the first selection criterion includes a quality score.

12. The system of claim 1, wherein the first content segment set includes one or more video segments, images, and/or audio segments.

13. A method for determining highlight segment sets, the method being implemented in a computer system that includes one or more processors configured by machine-readable instructions, the method comprising:
obtaining content files that define content in content segment sets, the content segment sets including a first content segment set that includes a first content segment and a second content segment;

determining individual highlight segment sets of content segments from the content segment sets, wherein determining a first highlight segment set of content segments included in the first content segment set includes:

(a) selecting an individual content segment included in the first content segment set as a selected content segment for inclusion in the first highlight segment set based on selection criterion, the selection criterion including a first selection criterion;

(b) determining diversity scores for content segments that are (i) included in the first content segment set and (ii) not yet selected for inclusion in the first highlight segment set, the diversity scores indicating a level of similarity between the individual content segments not yet selected for inclusion in the first highlight segment set and the selected content segment selected at operation (a); and (c) disqualifying one or more of the content segments for inclusion in the first highlight segment set for future iterations based on the diversity scores, iterating (a)-(c) for multiple iterations to determine the first highlight segment set.

14. The method of claim 13, further comprising iterating (a)-(c) until a threshold number of content segments are selected for inclusion in the first highlight segment set.

15. The method of claim 13, further comprising iterating (a)-(c) until there are no content segments remaining in the first content segment set that are not disqualified or included in the first highlight segment set.

16. The method of claim 13, wherein the diversity scores are determined based on visual similarity, temporal similarity, and semantic similarity between the individual content segments not yet selected for inclusion in the first highlight segment set and the selected content segment selected at operation (a), such that for a first iteration of (a)-(c), a first diversity score is determined based on the visual similarity, the temporal similarity, and the semantic similarity between the second content segment and the first content segment.

17. The method of claim 13, wherein the diversity scores are further determined based on emotive similarity between the individual content segments not yet selected for inclusion in the first highlight segment set and the selected content segment selected at operation (a), such that for a first iteration of (a)-(c), a first diversity score is further determined based on the emotive similarity between the second content segment and the first content segment.

18. The method of claim 13, wherein the second content segment is disqualified at the first iteration based on a first diversity score determined for the second content segment being below a threshold diversity score, the first diversity score indicating the level of similarity between the second content segment and the first content segment.

19. The method of claim 13, wherein the first content segment set includes the first content segment, the second content segment, a third content segment, and a fourth content segment, such that determining diversity scores for a first iteration of (b) includes determining a first diversity score for the second content segment, determining a second diversity score for the third content segment, and determining a third diversity score for the fourth content segment, wherein the first diversity score for the second content segment is determined based on the visual similarity, the temporal similarity, and the semantic similarity between the second content segment and the first content segment, the second diversity score for the third content segment is determined based on the visual similarity, the temporal similarity, and the semantic similarity between the third content segment and the first content segment, and wherein the third diversity score for the fourth content segment is determined based on the visual similarity, the temporal similarity, and the semantic similarity between the fourth content segment and the first content segment.

20. The method of claim 19, wherein responsive to the first diversity score and the second diversity score being below a threshold diversity score, disqualifying one or more the content segments includes disqualifying the second content segment and the third content segment for inclusion in the first highlight segment set for future iterations.

21. The method of claim 13, further comprising:
generating a graphical representation of attributes of one or more of the second content segment, a third content segment, and/or a fourth content segment based on one or more of a first diversity score determined for the second content segment, a second diversity score determined for the third content segment, and a third diversity score determined for the fourth content segment;
wherein one or more of the content segments are disqualified for inclusion in the first highlight segment set for future iterations based on the graphical representation.

22. The method of claim 13, wherein the second content segment is disqualified during a first iteration based on a first diversity score determined for the second content segment being less than other diversity scores for other content segments in the first content segment set, wherein the first diversity score for the first iteration indicates the level of similarity between the second content segment and the first content segment.

23. The method of claim 13, wherein the first selection criterion includes a quality score.

24. The method of claim 13, wherein the first content segment set includes one or more video segments, images, and/or audio segments.

* * * * *